United States Patent Office 3,383,360
Patented May 14, 1968

3,383,360
DIEPOXIDE ETHERS OF AZOPHENOLIC
COMPOUNDS AND RESINS THEREFROM
Stuart A. Harrison, Minneapolis, Minn., assignor to
General Mills, Inc., a corporation of Delaware
No Drawing. Filed Dec. 14, 1965, Ser. No. 513,840
7 Claims. (Cl. 260—47)

ABSTRACT OF THE DISCLOSURE

There is disclosed diepoxide ethers of azophenols or azocresols, a process of preparing same and the curing thereof with crosslinking agents having at least one active hydrogen to provide products having high heat distortion temperatures and excellent solvent resistance. The cured products find utility as casting and potting compositions, adhesives and coatings.

This invention relates to the diepoxide ethers of azophenols or azocresols and to the process of preparing and curing thereof. In particular, the invention relates to the diglycidyl ethers of p-azophenol (4,4'-dihydroxyazobenzene), and p-azocresol (4,4'-dihydroxy dimethyl azobenzene).

The diepoxide ethers of this invention may be cured with hardening or curing agents such as amines, anhydrides, $BF_3$ complexes, guanamines, p,p'-diaminodiphenyl sulfone and the like to provide products having very high heat distortion temperatures and excellent solvent resistance.

It is, therefore, an object of this invention to provide the diepoxide ethers of azophenols or azocresols and a process of preparing same.

It is also an object of this invention to provide cured diepoxide ethers of azophenols or azocresols and a process of curing same.

The starting materials for the present invention are the azophenols or azocresols, such as p-azophenol (4,4'-dihydroxyazobenzene) which is well known and may be prepared by any conventional procedure such as (1) diazotizing p-aminophenol and coupling, (2) direct reduction of p-nitrophenol or (3) by fusion of p-nitrophenol with potassium hydroxide. The corresponding ortho or meta-azophenol or azocresol may be prepared in the same manner by use of the corresponding ortho or meta product.

These starting materials may be defined by the following generic formula

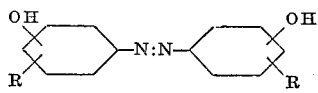

where R is hydrogen or $CH_3$ dependent on whether the corresponding material is azophenol or azocresol. In the azophenols, the OH group may be in either the ortho (o), meta (m) or para (p) position as in 2,2', 3,3' or 4,4' dihydroxy azobenzene. In the azocresols the $CH_3$ group may be either ortho, meta or para oriented in which case the OH group must be oriented in either of the other two positions. If the $CH_3$ groups are ortho oriented, the OH group may be either meta or para oriented. Correspondingly, if the $CH_3$ groups are meta oriented, the OH groups must be ortho or para oriented and if the $CH_3$ groups are para oriented, the OH groups must be ortho or meta oriented. Thus the products may be 4,4'-dihydroxy-2,2'-dimethyl azobenzene; 3,3'-dihydroxy-2,2'-dimethyl azobenzene; 4,4'-dihydroxy-3,3'-dimethyl azobenzene; 2,2'-dihydroxy-3,3'-dimethyl azobenzene; 2,2'-dihydroxy-4,4'-dimethyl azobenzene and 3,3'-dihydroxy-4,4'-dimethyl azobenzene.

The diglycidyl ethers of these starting materials are prepared by reacting the starting material discussed hereinabove with an epihalohydrin such as epichlorohydrin. This is preferably accomplished by dissolving the starting materials discussed hereinabove in an inert, non-reactive solvent, adding an excess of epihalohydrin and conducting the reaction in the presence of an alkaline material. The reaction is conducted at reflux temperatures which will generally range from 30 to 175° C. In general, temperatures above 130° C. may cause some darkening in color, but may be employed where color is no object. The reaction is conducted for a time sufficient to complete reaction. In general, this will require from 1 to 10 hours, although from 2 to 5 hours are more generally employed. The exact time of reaction is not critical so long as it is of sufficient duration to result in substantially complete reaction to provide the desired product. After reaction, any solvent and unreacted epihalohydrin is removed by distillation and the remaining solid filtered. If desired, the product may be purified by recrystallization from solvents such as toluene, xylene or benzene.

Epihalohydrins used in preparing the compounds include epichlorohydrin, epibromhydrin and epiiodohydrin. Epifluorohydrin is generally not employed as it is rather unreactive and may require impractical reaction times. These materials are all characterized by a three carbon atom chain; however, analogs of the aforesaid epihalohydrins may also be used. Examples of these are 1,4-dichloro-2,3-epoxy butane, beta- and gamma-methyl epichlorohydrins and the like. In view of its availability and relatively low cost, epichlorohydrin is preferred.

The exact nature of the alkaline material, which is a catalyst, is not critical. Generally, the alkali metal or alkaline earth metal hydroxides, such as sodium, potassium or calcium hydroxide, are employed. Other alkaline materials which are suitable are the alkali metal aluminates, silicates and zincates.

As indicated, an excess of the epihalohydrin is employed. As two moles of epihalohydrin will react with one mole of the azophenol or azocresol, accordingly more than two moles of epihalohydrin, such as in excess of 2.5 moles, are generally employed per mole of azophenol or azocresol. The epihalohydrin is commonly employed in an excess up to about 15 moles of epihalohydrin per mole of azophenol or azocresol. The alkaline catalyst is generally employed in slight molar excess of the azophenol or azocresol, although equimolar amounts may be employed. Generally it is not necessary to exceed 3 moles of alkaline material per mole of azophenol or azocresol, and generally the amount of alkaline material will be in the range of 1.2–2 moles of alkaline material per mole of azophenol or azocresol.

The resulting products of the present invention may be defined by the following idealized formula

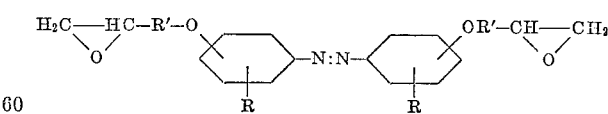

where R is hydrogen or methyl, dependent on whether the starting material is azophenol or azocresol, and R' is a divalent, straight or branched chain, aliphatic hydrocarbon radical having from 1 to 6 carbon atoms dependent on the particular epihalohydrin employed. Generally R' will be a methylene radical where the three carbon atom epihalohydrins, such as epichlorohydrin, are employed.

The invention can best be illustrated by means of the following examples:

Example I.—Preparation of para-azophenol

Para-azophenol was prepared substantially as described by Willstatter and Benz, Ber. 39, 3492 (1906). The following materials were placed in an iron pot:

| | Grams |
|---|---|
| p-Nitrophenol | 200 |
| KOH | 1,000 |
| $H_2O$ | 200 |

The materials were mixed manually as the temperature was raised slowly to 180° C. at which temperature an exothermic reaction takes place and heating is ceased. The temperature is maintained within 180–190° C. by alternately heating and air cooling, for about 4½ hours. The solid product after cooling, was dissolved in 5 liters of water, acidified with dilute sulfuric acid and the solid material recovered by filtration. After drying in a vacuum oven, the product was dissolved in 3 liters of U.S.P. ether and washed six times with 200 cc. portion of 6 N $H_2SO_4$. The solution was then washed twice with 1 liter of water and dried over anhydrous $Na_2SO_4$. After evaporation of the ether, a solid product, p-azophenol, weighing 45.2 grams, was recovered.

Example II.—Preparation of the diglycidyl ether of p-azophenol

The p-azophenol product of Example 5 (45.2 grams) was dissolved in isopropanol (200 cc.) and epichlorohydrin (550 grams) and sodium hydroxide pellets (16.3 grams were added. The mixture was stirred and held at reflux temperature for three hours. The isopropanol and most of the unreacted epichlorohydrin was then removed by distillation. The remaining solid was recovered by filtration and purified by recrystallization from toluene. The first fraction weighed 42 grams and had a melting point of 159–165° C. and an oxirane oxygen content of 9.58%.

In a similar manner, the diglycidyl ether of orthoazophenol, meta-azophenol, and of ortho, meta, and para-azocresols are prepared.

The diglycidyl ether products may then be cured or crosslinked to provide infusible and insoluble products. These cured products find utility as casting and potting compositions, adhesives, and coatings. The compositions are particularly useful where high heat distortion (flexural deformation) temperatures or solvent resistance is required. Castings are provided which have higher heat distortion temperatures than the usual commercially available epoxy resins.

The diglycidyl products of this invention may be cured or crosslinked by reaction with compounds containing active hydrogen, such as amines, particularly polyamines, amides, particularly amino-polyamides, mercaptans, polyhydric alcohols, polyamines, acid anhydrides and the like to give a wide variety of valuable reaction products. Illustrative of such products containing active hydrogens are Ethylene diamine
Polyalkylene polyamines, such as diethylene triamine, triethylene tetramine and tetraethylene pentamine
Diethylaminopropylamine
Aromatic diamines such as p-xylylene diamine, meta-phenylene diamine, methylene dianiline
Diaminodiphenylsulfone
Dicyandiamide
Amino-polyamides of polyalkylene polyamines and polymeric fat acids
Phthalic anhydride
Dodecenyl succinic anhydride
Hexahydrophthalic anhydride
Chlorendic anhydride
Pyromellitic dianhydride-maleic anhydride mixtures
Guanamines, such as formoguanamine, benzoguanamine, propyl guanamine, butyl guanamine, allyl guanamine, 2,4-diamino-6-undecyl triazine, cocoguanamine, oleyl guanamine, linoleyl guanamine
Piperidine
$BF_3$ complexes with amines such as monoethylamine, piperidine, pyridine and diethylaniline
Benzyldimethylamine
Dimethyl-aminomethyl phenol
Tridimethyl aminomethyl phenol The curing of the diglycidyl ethers of this invention may best be illustrated by means of the following examples, using curing agents in the above mentioned list. For purposes of brevity, specific examples are given for three of the curing agents in said list.

Example III

The diglycidyl ether of p-azophenol of Example II (16.2 grams) was heated to 180° C. and p,p'-diamino diphenylsulfone (6.2 grams) was added slowly. The solution obtained was poured into a ½ inch by ½ inch by 6 inch brass mold coated with a silicone release agent. The casting was cured for four hours and ten minutes at 170° C. The cured casting had the following properties:

| | |
|---|---|
| Barcol hardness | 56 |
| Heat distortion temperature ° C. | >220 |
| Flexural strength p.s.i. | 14,460 |
| Flexural modulus p.s.i. | $3.3 \times 10^5$ |

Example IV

The diglycidyl ether of p-azophenol of Example II (1.68 grams) was mixed with meta-phenylene diamine (0.3 gram) and spread on a hot panel. The film cured in 3 minutes at 350° C. to give a hard, solvent resistant coating.

Example V

The diglycidyl ether of p-azophenol (1 gram of Example II was mixed with 2,4-diamino-6-undecyl triazine (0.15 gram) and heated to 450° F. for eight minutes. The resulting film was hard, tough and solvent resistant.

In the same manner, the diglycidyl ether of the present invention is cured with the agents listed hereinabove. Some of these curing agents will require the use of heat to cure the product. Others will cure at room temperature. Some of the curing agents such as the $BF_3$ amine complexes are catalytic curing agents, used in small amounts while others are employed in stoichiometric amounts to achieve curing.

In the compositions cured, there may also be included in the usual manner, other materials which do not affect the basic composition such as fillers, pigments, dyes and the like to enhance or provide special properties.

The embodiments of the present invention in which an exclusive property or privilege is claimed are defined as follows:

1. A diepoxide compound of the formula $$H_2C\underset{O}{-}\overset{H}{\underset{|}{C}}R'-OR'-\text{[benzene]}-N{:}N-\text{[benzene]}-OR'-\overset{H}{\underset{|}{C}}-CH_2$$

where R is selected from the group consisting of hydrogen and methyl and R' is a divalent, aliphatic, hydrocarbon radical having from 1 to 6 carbon atoms.

2. A compound as defined in claim 1 wherein R is methyl and R' is methylene.

3. A compound as defined in claim 1 wherein R is hydrogen and R' is methylene.

4. A compound as defined in claim 3 wherein $$-OR'-\overset{H}{\underset{|}{C}}\underset{O}{-}CH_2$$

is in the para position.

5. An infusible and insoluble resinous product comprising the reaction product of a crosslinking agent containing at least one active hydrogen and a diepoxide of the formula

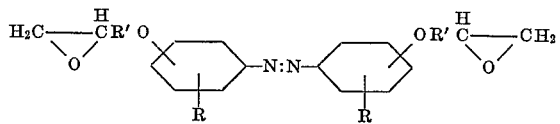

where R is selected from the group consisting of hydrogen and methyl and R' is a divalent, aliphatic hydrocarbon radical containing from 1 to 6 carbon atoms.

6. A product as defined in claim 5 wherein R is methyl and R' is methylene.

7. A product as defined in claim 5 wherein R is hydrogen and R' is methylene.

References Cited

UNITED STATES PATENTS

| | | | |
|---|---|---|---|
| 2,467,171 | 4/1949 | Werner et al. | 260—348 |
| 2,585,115 | 2/1952 | Greenlee | 260—47 |

WILLIAM H. SHORT, *Primary Examiner.*

T. D. KERWIN, *Assistant Examiner.*